United States Patent [19]
Beardsley et al.

[11] Patent Number: 5,155,814
[45] Date of Patent: Oct. 13, 1992

[54] NONSYNCHRONOOUS CHANNEL/DASD COMMUNICATION SYSTEM

[75] Inventors: Brent C. Beardsley; Keith A. Bello; Michael T. Benhase; Florence J. Clark, all of Tucson, Ariz.; Paul W. Hunter, San Jose, Calif.; Donald M. Nordahl, Tucson, Ariz.

[73] Assignee: International Business Machines Corporation, Armonk, N.Y.

[21] Appl. No.: 575,735

[22] Filed: Aug. 31, 1990

[51] Int. Cl.$^5$ ............................................. G06F 13/12
[52] U.S. Cl. .................................. 395/275; 395/250; 364/DIG. 1; 364/239.4; 364/239.7; 364/238.3; 364/241.9; 364/248.1; 364/270.6
[58] Field of Search ....................... 395/275, 250, 425; 364/200 MS File, 900 MS File

[56] References Cited

U.S. PATENT DOCUMENTS

| | | |
|---|---|---|
| 4,571,674 | 2/1986 | Hartung .............................. 364/200 |
| 4,636,946 | 1/1987 | Hartung et al. ..................... 364/200 |
| 4,779,189 | 10/1988 | Legvold et al. ..................... 364/200 |
| 4,780,808 | 10/1988 | Moreno et al. ..................... 395/800 |
| 4,868,734 | 9/1989 | Idleman et al. ..................... 395/275 |

Primary Examiner—Michael R. Fleming
Assistant Examiner—Debra A. Chun
Attorney, Agent, or Firm—Greenlee & Winner

[57] ABSTRACT

A control unit for DASD operation to transfer data between the device and a buffer and between a channel and a buffer. In that manner the channel and device are enabled to transfer data independently of each other. Mechanisms are provided for communication between the channel interface process in the control unit and the device interface process in the control unit. Some of these mechanisms are stored with the record in the buffer and others are stored in control storage. Principle communicating mechanisms include a device record pointer, a channel record pointer, a next operation field, a device state indicator, record control flags, and two buffer pointers.

7 Claims, 5 Drawing Sheets

READ RECORD IMAGE IN BUFFER

| TABLE 1. | RECORD IMAGE (READS) |
|---|---|
| BYTE | NAME |
| 0 | PREVPTR |
| 1 | DORF. R |
| 2-3 | NOF |
| 4-5 | RCF - RECORD CONTROL FLAG BYTES |
| 6-7 | RESERVED |
| 8-39 | COUNT |
| 40-41 | UNUSABLE |
| 42- | KEY, DATA |

WRITE RECORD IMAGE IN BUFFER

| TABLE 2. | RECORD IMAGE (WRITE) |
|---|---|
| BYTE | NAME |
| 0 | PREVPTR |
| 1 | INTCT |
| 2-3 | NOF |
| 4-5 | RCF - RECORD CONTROL FLAGS |
| 6-7 | RESERVED |
| 8-31 | COUNT |
| 32-39 | COUNT |
| 40-41 | UNUSABLE |
| 42- | KEY, DATA |

FIG. 3.

RECORD CONTROL FLAGS IN BUFFER

| TABLE 3. RECORD CONTROL FLAGS (RCF) ||
|---|---|
| BIT | NAME |
| 0:7 | RCF1 |
| 8:15 | RCF2 |
| 0 | WRTIMAG |
| 1 | GOTOEOT |
| 2 | NOKEYRQ |
| 3 | NODATRQ |
| 4:6 | RESERVED |
| 7 | CRETRY |
| 8:9 | RECORD TYPE BITS<br>00 REC N<br>01 HOME ADD<br>10 REC 0<br>11 INDEX, EOT |
| 10 | INVTRK |
| 11 | GOCHOPS |
| 12:14 | RESERVED |
| 15 | DRETRY |

FIG. 4.

| TABLE 4. RULES FOR STORING DATA INTO THE BUFFER | | |
|---|---|---|
| WRAP | END OF BUFFER FILLER POINTER COMPARED TO BUFFER EMPTIER POINTER | ACTION |
| 0 | ANY | OK TO PROCEED |
| 1 | < | OK TO PROCEED |
| 1 | ≥ | DIP REORIENT<br>CHIP FILLS AVAILABLE BUFFER SPACE WITH DATA<br>NOTE: "END OF BUFFER FILLER POINTER" POINTS TO LOCATION IN THE BUFFER WHERE AVAILABLE SPACE ENDS FOR THE LEADING (FILLING) PROCESS. |

| TABLE 5. RULES FOR REMOVING DATA FROM THE BUFFER | | |
|---|---|---|
| WRAP | BUFFER FILLER POINTER COMPARED TO BUFFER EMPTIER POINTER | ACTION |
| 1 | ANY | OK TO PROCEED |
| 0 | > | OK TO PROCEED |
| 0 | = | DIP - WAIT FOR NOFVAL = 1<br>CHIP<br>COUNT - WAIT FOR DORF.F ≥ 3<br>KEY - WAIT FOR DORF.F ≥ 5<br>DATA - WAIT FOR DORF.F ≥ 6 |
| 0 | < | MUST WAIT |

FIG. 5.

NONSYNCHRONOOUS CHANNEL/DASD COMMUNICATION SYSTEM

This invention relates to data processing systems and, more particularly, to control of DASD peripheral data processing systems operating in a nonsynchronous manner.

BACKGROUND OF THE INVENTION

Data processing systems frequently include large scale storage devices, such as Direct Access Storage Devices (DASD), located externally to the host computer and sometimes at significant distances therefrom. Communication from the host computer to the DASD is accomplished over signal cables, called channels, extending between the DASD and its control unit and connecting them to the host processor.

Current technology provides DASD units with several separate disks, all rotating on the same spindle. These disks, or platters, are accessed by head disk assemblies with a transducing head providing access to one surface of each disk. There may be, for example, nine platters in a disk drive providing 16 usable surfaces with one of the usable surfaces used for maintaining accurate tracking capability. In such units, there are 15 usable surfaces for data and when all the heads are positioned, a cylinder of 15 physical, recording tracks can be accessed.

DASD units frequently use a Count Key Data architecture (CKD) where records written on the track are provided with a count field (an ID), a key field and a data field.

In writing these fields along a recording track, a gap is provided between each of the fields. Those gaps are then utilized to provide a time period in which the DASD control unit and the host channel can communicate with each other. It is during the gap time that the control unit provides information back to the channel in response to the command that it has received and gets the next command in order to begin the next operation for searching, retrieving or writing records. This process is termed gap synchronous, that is to say, that the particular record on which the DASD device is working, is the same record on which the channel has requested work, so that both the channel and the device are synchronous with each other in the sense that they are both working on the same record, either to read it or to write it.

As systems become faster and faster, the delays created by the gaps or by the performance of functions within a gap period have to be shrunk to such an extent that the functions can no longer be adequately performed. This is particularly true of optical fiber channels where the data burst rate is several times the burst rate for copper channels.

With the instant invention, nonsynchronous storage subsystems are developed to enable the channel and the device to transfer data independently of each other. To do that, a buffer has been inserted into the data path between the device and the channel with separate data paths for the channel and the device, each under the control of separate processors. In that manner, the device processor can access records in one portion of the buffer while another portion of the buffer is being used by the channel processor. Channel programs can be executed such that the channel and storage control activities required to end execution of one command and advance to the next do not have to occur during the inter-record gap between two adjacent fields.

In a synchronous system, the device and channel operate on the same record so that the data transferred to the buffer by the device is the same data that the channel wants. In the control unit for such a system, shared variables are all that are required to implement the interface between the channel processor and the device processor. Simple shared variables are adequate because the channel processor and device processor are always performing the same operation on the same field. In a nonsynchronous system, however, the device may operate significantly ahead of the channel during read operations. The device processor is transferring data into the buffer from the device while the channel processor is accessing that data in order to send it on to the channel. The device processor is therefore the filling or leading activity, while the channel processor is the trailing or lagging activity. The reverse is true during write operations where the channel processor fills the buffer with data from the channel and, subsequently, the device processor accesses that data to send it to the device for writing the records on the storage disks. In this instance, the channel processor is the leading, or filling activity while the device processor is the trailing, or emptying activity. Since in a nonsynchronous control unit the channel and the device processors can be performing different operations on different fields, a more elaborate communication system between the two is required.

An object of this invention is to allow the channel and device processors to operate concurrently on different fields as well as operate concurrently on the same field.

Another object is to improve performance by keeping a series of controls for the record physically with the record in the buffer.

Still another object is to prevent the trailing process from catching up and overrunning the leading process.

Another object is to enable the leading process to transfer multiple records to the buffer by wrapping around to the beginning of the buffer without catching up to and overrunning the trailing processor.

SUMMARY OF THE INVENTION

Briefly stated, this invention is a communication system with specific mechanisms for communication between the channel process and the device process. The system has as its principal elements two record pointers, a next operation field list, a device process state indicator, record control flags, and two buffer pointers. Certain of these elements are stored with the record in the buffer for easy access by both the device and channel processes.

BRIEF DESCRIPTION OF THE DRAWINGS

The above-mentioned and other features and objects of the invention and the manner of attaining them become more apparent, and the invention itself will best be understood by reference to the following description of the invention taken in conjunction with the accompanying drawings, the description of which follows.

DETAILED DESCRIPTION

To operate nonsynchronously, an Extended CKD architecture (ECKD) has been developed to permit channel programs to describe the nature and scope of a data transfer before the first data transfer command is executed. ECKD includes a locate record extended command which uses a variable length parameter list to define the operational domain for the subsequent Channel Command Word (CCW) chain. The parameters specify the operation to be performed, the location and number of records or tracks to be processed, and the transfer length factor. In that manner, the storage subsystem is informed of the type of data transfer to be performed, the number of records to be operated upon, and the track sector and record ID to which the device must be positioned prior to initiating data transfer.

Nonsynchronous operation does not define how far apart in time the channel and device operations must be, and does not limit how far apart they can be. During read operations, the device control can read a few bytes, a field, a record, or even several records into the buffer before the first read command is executed. In write operations, the channel control can receive one or more write commands and transfer the associated data into a buffer before the first field is written to the device.

ECKD uses the same track addressing scheme as the well-known CKD scheme. The track is the smallest directly addressable space on a device, and each track has an arbitrary starting point called an index. The track format is the same in ECKD as it is in CKD. The first area on the track is the home address, which identifies the track, and is followed by a special record called record zero containing the address of the track. Record zero is then followed by a data area containing user records.

Before data transfer can begin, the device control must be oriented. It does that by detecting either the index point or the start-of-count area other than record zero. Once the count area, or index, has been detected, the device control can work its way down the track to perform the operations commanded by the channel.

After validating the locate record parameters, the control unit directs the device to seek to a first-specified track, positions the device to the designated sector, and begins a search operation to further position itself to a particular record area on the track.

Figure 1:
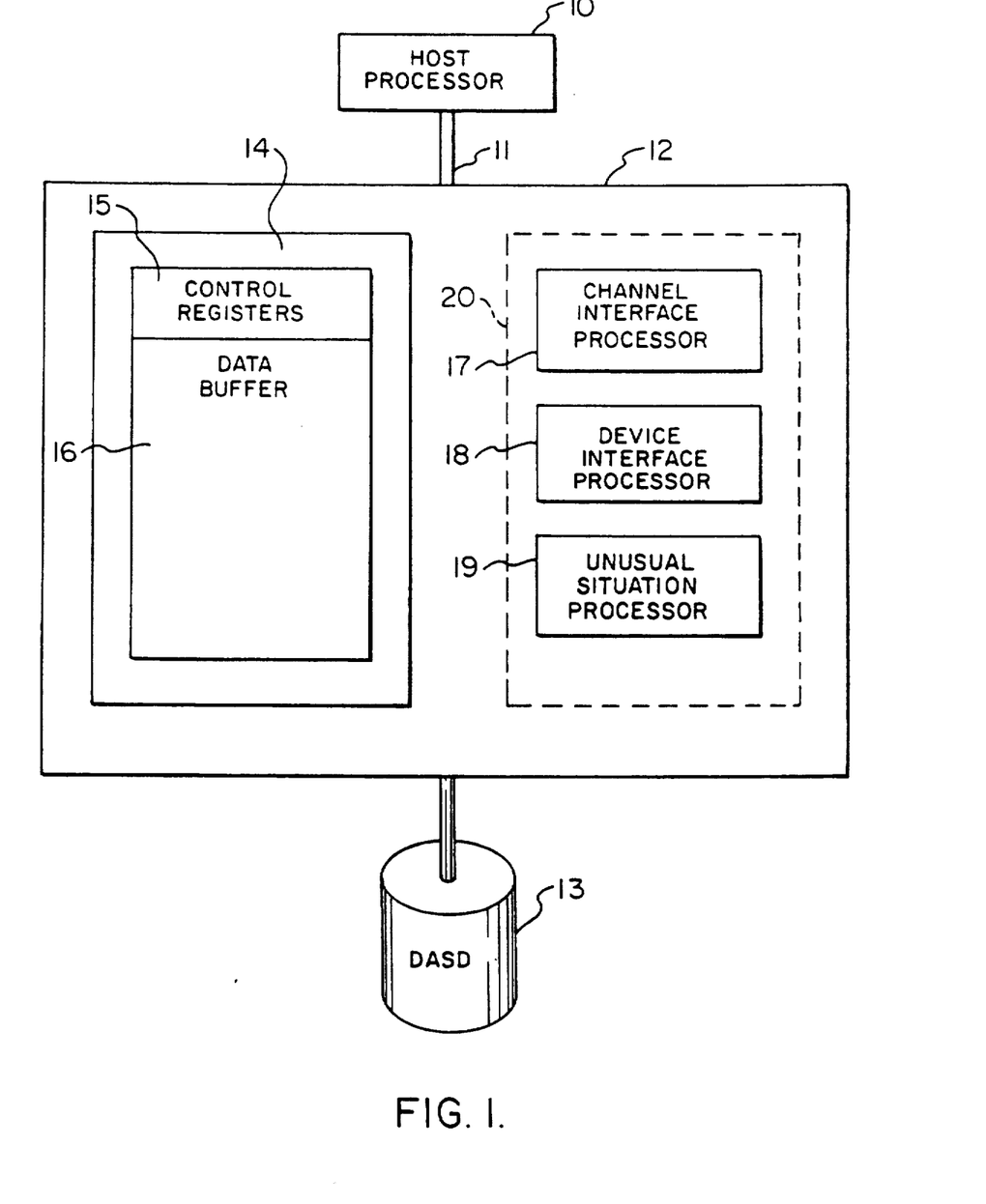
FIG. 1 shows a simplified block diagram of a data processing system including the instant invention.

FIG. 1 shows a simplified block diagram of a data processing system including the instant invention. Host processor 10 is connected by a channel 11 to a control unit 12. Control unit 12 and DASD 13 comprise a peripheral data processing subsystem for managing storage activities on the DASD. FIG. 1 is simplified. Actually there may be several channels 11 connected to the control unit 12. At the current time, one common configuration has 16 channels connected to a control unit. As a result, there can be up to 16 host processors connected into the one control unit, although redundancy requirements generally limit the number of host processors. In the same configuration, the control unit can be connected to 64 DASD; however, for purposes of the instant invention, it makes little difference how many channels or how many DASD are connected to the control unit and therefore the simplified scheme, as shown in FIG. 1, is sufficient for explaining the environment of this invention.

Control unit 12 contains all of those electronic circuits, microprocessors and microcode needed to manage the data transfer between the channels and the DASD. Such devices are well known, and only a portion of the circuits within the control unit 12 are illustrated in FIG. 1. FIG. 1 shows a control storage 14 which contains control registers 15 and a data buffer 16. Control storage 14, and the various buffers and registers therein, are connected to, and controlled by, a channel interface processor 17, a device interface processor 18 and an unusual situation processor 19. Channel processor 17, device processor 18 and unusual situation processor 19 have access to the data buffer 16, and may also have access to other storage areas, such as cache storage, not shown in FIG. 1. It should be noted that device processor 18 and channel processor 17 can be separate processors or they can be implemented as separate processes operating on the same processor 20. Implementation as separate processors, or as separate microcode modules on the same processor, is a matter of choice dictated primarily by speed and cost considerations. The terms "Device Interface Processor" and "Device Interface Process" are synonymous as used herein, as are the similar terms for channel process and channel processor.

Figure 2:
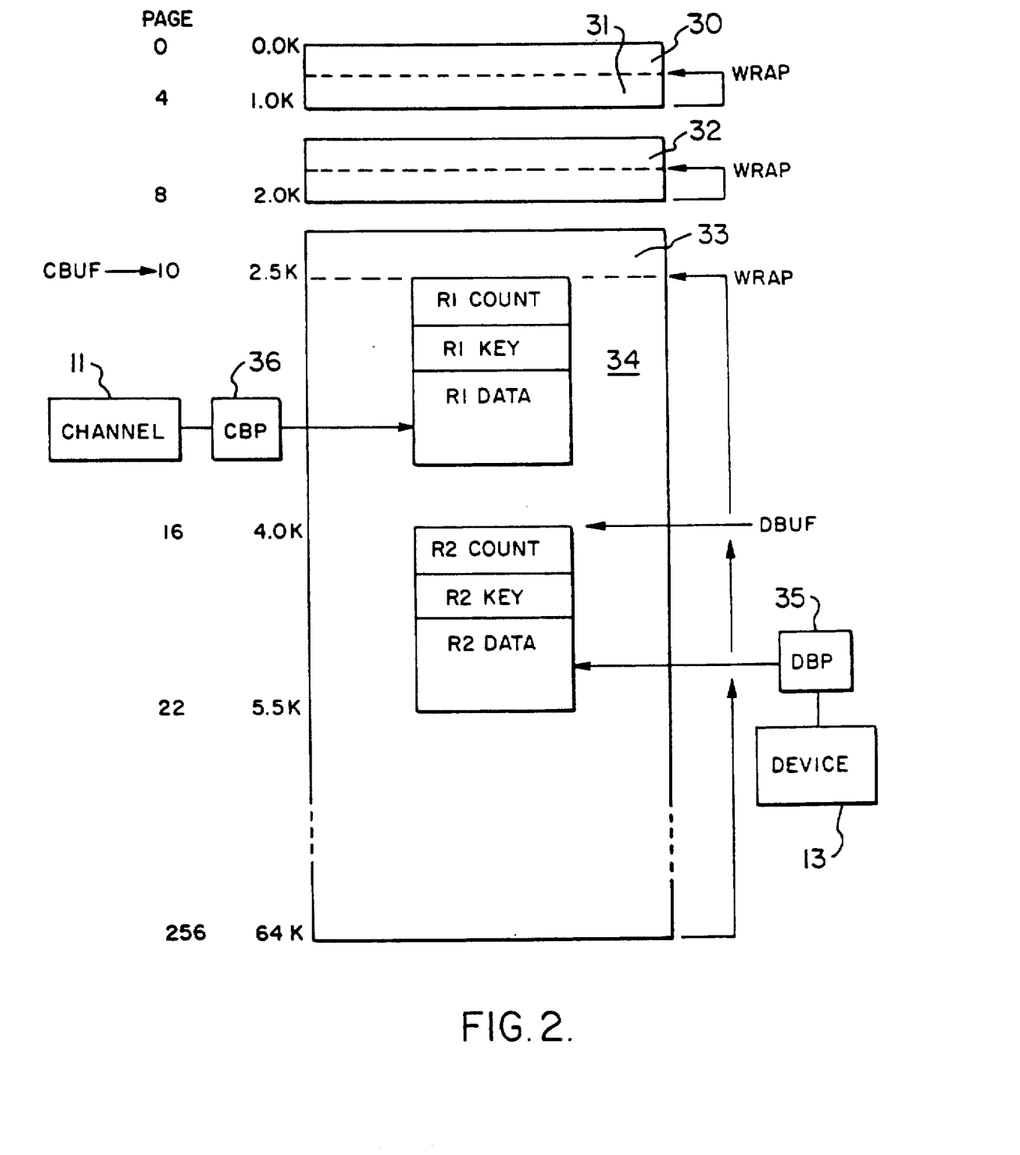
FIG. 2 shows a layout of the buffer.

FIG. 2 shows the layout of data buffer area 16. In the implementation shown in FIG. 2, 64 K bytes are included in the data buffer with a first 1.0 K area separate and distinct from the area between 1.0 K and 2.0 K with that second area separate and distinct from the main portion of the buffer extending from 2.0 K through 64 K. In that manner, certain separate activities can go on in the three separate portions of the buffer. For example, in portion 30, control commands may be placed in the protected area, while cache and the channel data transfer can occur in the wrap area 31. Area 32 can be used for error correction.

The main 62 K portion of the buffer is that portion of the buffer utilized for transferring data between the device and channel. Count fields for write operations (and key fields for branching operations when the key field is not updated) may be located in the protected area 33 while the data goes in the remaining 61.5 K, area 34, termed hereafter the wrap area. Illustrated in FIG. 2 are the various records being transferred to or from the device and channel. As illustrated, the device 13 is currently accessing the data field of record 2 and a Device Buffer Pointer (DBP) 35 points to that particular location in the record 2 data field. Similarly, FIG. 2 illustrates that channel 11 is currently accessing data from record 1 and a Channel Buffer Pointer (CBP) 36 contains the address of the wrap data field in record 1. This graphically depicts, in nonsynchronous operation, the fact that the device 13 and the channel 11 may be operating on different records.

FIG. 2 can be used to illustrate some communication problems in nonsynchronous operation which are remedied by the instant invention. For example, let us suppose that a read operation is underway; therefore, the device process 18 leads the channel process 17. With reference to FIG. 2, record 1 has been transferred into the buffer and the device process is currently transferring record 2 from the device into the buffer. The channel process 17 is currently transferring record 1 data from the buffer to the channel. If for some reason the trailing channel process 17 were to catch up with the leading device process 18 and pass it by, channel 11 would then be receiving meaningless data. Similarly, if the leading device process were to reach the last location in the buffer and wrap back around to read more records into the buffer beginning at the first location in the wrap portion of the buffer (at 2.5 k,) the device process might eventually overtake the channel process and pass it by, in which case, the channel would not receive all of the records for which it had issued its read commands. This invention addresses this problem by installing communicating mechanisms in the system to prevent these situations from occurring.

For proper communication between the channel process or processor (CHIP) and the device process or processor (DIP), the communication system of this invention has, as its principal elements, two track pointers, a Next Operation Field (NOF) list, a DIP-state indicator, Record Control Flags (RCF), and two buffer pointers.

The two track pointers are named Channel Orientation Record and Field (CORF) and Device Orientation Record and Field (DORF). CORF indicates the intended operating position on the track for the channel process (CHIP), while DORF indicates where DIP is on the track. By comparing these two pointers, the relative positions of the channel program and the device can be ascertained.

CORF and DORF each consist of two elements: (1) A record count (CORF.R and DORF.R), and (2) a field identifier (CORF.F and DORF.F). These parameters are maintained in the storage control registers 15, except that DORF.R is also stored with the record in data buffer 16 for read operations.

A record count of one or two indicates the associated process is operating on a home address, or record zero, respectively. Other values in the record count are useful to determine the relative positions of CHIP and DIP, but do not necessarily relate to specific records on the track.

The DORF field identifier (DORF.F), located in control register 15, indicates the exact field on which DIP is operating. Normally, the parameter is changed by DIP; however, when errors occur in the data field, after they are corrected by the unusual situation processor 19, the processor 19 will change DORF.F to a special value to indicate to the channel process that the data field is valid and that it should not wait for DIP to advance to the next record. If the data is for the last CCW in the command chain, time is saved that would otherwise be spent waiting for DIP to reorient to the record.

Whereas the DORF.F parameter indicates the exact field on which DIP is operating, the CORF.F parameter indicates the next desired field on which CHIP will operate.

The Next Operation Field (NOF) parameter is used by CHIP on write or find operations to direct DIP's operation. Its main use is when the channel program starts out ahead of the device during write operations. As CHIP advances through the channel program, a NOF entry is stored in the buffer 16 for each write command. In that manner, when DIP reaches the required point in the buffer, it can fetch the NOF and specified operations may then be performed by DIP.

A NOF Valid Indicator (NOFVAL) is contained in bit zero of the CORF.F register. It is used by CHIP to signal DIP when various operations have been completed by CHIP during write operations. Primarily, this is for indicating that the NOF and the intent count have been stored in the buffer 16.

Note that the NOF is used by CHIP on writes to direct DIP's operation. On read operations, NOF need not be present; the device just goes ahead and reads records in sequence. However, if a NOF were present, the device would do whatever the NOF indicated needed to be done.

The DIP state indicator is set by DIP in the control registers 15, enabling CHIP to detect whether DIP is idle, active in executing write and find operations, active in executing read operations, or in error.

The Record Control Flags (RCF) are stored in the buffer in the record to be used by both CHIP and DIP. CHIP uses these flags to direct DIP to skip the next field or the remaining records in a track. DIP uses the flags to inform CHIP of a record type and if an invalid track error has been detected.

Finally, there are two buffer pointers which are named the Channel Buffer Record pointer (CBUF) and the Device Buffer Record pointer (DBUF). CBUF is set by CHIP to indicate the buffer address of a record CHIP is currently processing. DBUF is set by DIP to indicate the buffer address of a record DIP is currently processing. These two pointers, together with the Buffer Wrap Around (WRAP) parameter are used by both CHIP and DIP to control the filling and emptying processes so that the two processes do not overlay each other. They also point to the buffer record containing the NOF and RCF for the records being processed by CHIP and DIP. CBUF and DBUF are maintained in the control storage registers 15. Referring to FIG. 2, note that DBUF points to the location at the beginning of the record being processed by DIP, that is, record R2, while CBUF points to the address at the beginning of the record being processed by CHIP, that is, record R1. At this point, it should also be noted that the buffer is divided into 256-byte pages and each record placed into the buffer starts on a page boundary. Therefore, record R1 begins at page 10, while record R2 begins at page 16. CBUF and DBUF will always point to an address in the buffer at a page boundary, while the Device Buffer Pointer (DBP) 35 and the Channel Buffer Pointer (CBP) 36 point to the location of the device, or channel, within the record.

The Previous Page Pointer Parameter (PREVPTR) is a one-byte value in each buffer record image which points to the first buffer page of the previous record. It is included with each record to ensure that the trailing and leading processes are in sync with respect to buffer addressing. The leading process stores the parameter in the buffer after it has advanced its pointer to the new record location. When the trailing process advances its pointer to what it calculates to be the start of the next record, it compares PREVPTR with the location of the previous record. If the values match, then the new trailing process pointer (that is, CBUF for CHIP or DBUF for DIP) is assumed to be correct. If the values don't match, then the current pointer is in error.

The Intent Count parameter (INTCT) is also stored in the buffer for write operations. During a write operation, CHIP stores the value of the intent count into the buffer whenever CBUF is advanced to the next record. The intent count indicates the number of records remaining to be processed in the domain of the write operation. In the write domain, every channel command operates on a record boundary; therefore, the number of CCW's remaining to be processed equals the intent count. The intent count is a parameter originally passed with the Locate Record command and is stored in the control registers upon initialization. CHIP then decrements the intent count in the internal register at the completion of each write CCW or at the completion of each read CCW which crosses a record boundary.

Figure 3:
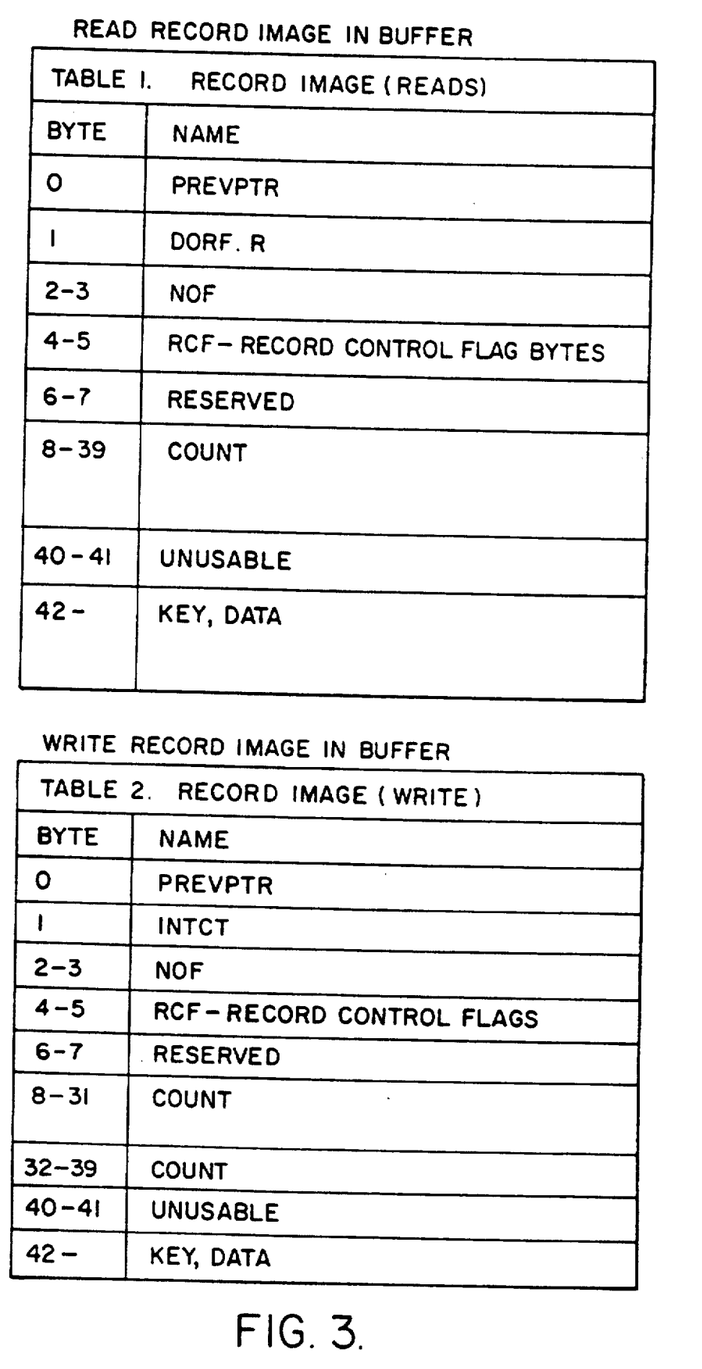
FIG. 3 shows Tables 1 and 2. Table 1 shows those control parameters which are included with the record in the buffer on read operations. Table 2 shows the control parameters included with the record in the buffer on write operations.

FIG. 3, Table 1 shows the parameters stored in the buffer for read operations. At byte 0, the previous page pointer is stored which notes the page upon which the previous record began. This value is stored by DIP when it has advanced the pointer and verified later by CHIP. At byte 1, the DORF.R parameter is stored showing the relative record number of the record. This is the record number that the device was working on when it was processing this record. At bytes 2 and 3, the next operating field parameter is stored which is all zeroes on read operations. At bytes 4 and 5, the record control flags are stored which are bytes initialized by DIP. Byte 4 is used by CHIP to relay messages to DIP concerning how much of this record, or of the remaining track, is needed by CHIP. Byte 5 is used by DIP to relay messages to CHIP, such as the type of record or that a track is invalid. The count field is stored at bytes 8 to 39 and the key and data fields are stored at bytes 42+.

FIG. 3, Table 2, shows the parameters stored with the record image in the buffer on write operations. At byte 0, the previous page pointer is stored. This value is stored by CHIP when it has advanced the pointer and verified later by DIP. At byte 1, the intent count is stored to show the number of records remaining to be processed in the write domain. At bytes 2 and 3, the next operation field is stored to direct DIP when it reaches that record. Bytes 4 and 5 store the record control flags which are initialized by CHIP and used by DIP to indicate the status of this record relative to errors encountered. At bytes 8 to 31, the count field for the write special home address instruction is stored and, at bytes 32 to 39, the count is stored as transferred from the host. At bytes 42+, the key and data fields are stored.

Figure 4:
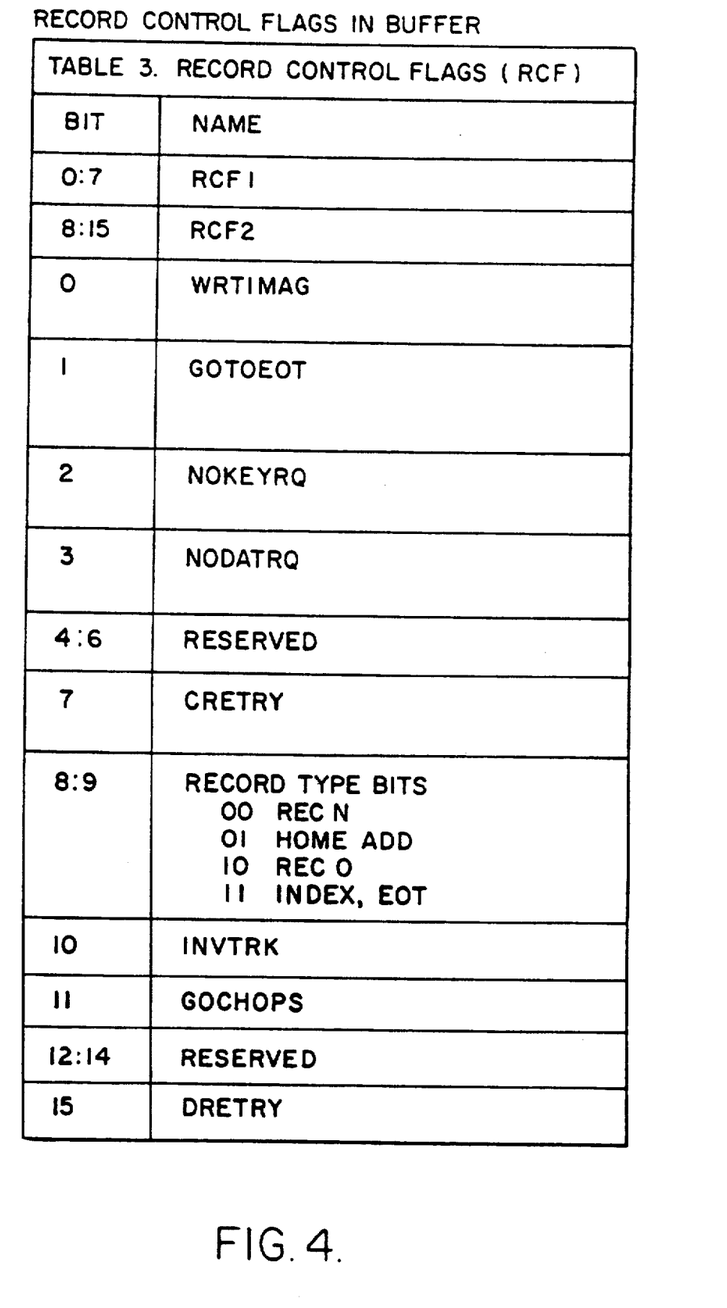
FIG. 4 is comprised of Table 3 which shows additional control parameters included in the buffer.

FIG. 4 shows a breakdown of the various record control flags in the buffer. RCF1 is initialized by the buffer filling process, subsequently set by CHIP and tested by DIP. RCF2 is initialized by the buffer filling process, subsequently set by DIP and tested by CHIP. Note that CHIP initializes RCF1 when CBUF is advanced on a write operation. DIP initializes RCF2 when DBUF is advanced on read operations.

In RCF1, the write image parameter is a bit initialized by CHIP to 1 during writes and to zero by DIP on reads. When set to 1, this bit indicates that the record is a write image; when set to zero, this bit indicates that the record is a read image. At bit 1, the Go-To-End-Of-Track parameter is set by CHIP if the remaining records on this track are not required. This parameter may be used to allow CHIP to get DIP past an uncorrectable error on the count field of a record not needed by CHIP. The No Key Required parameter is set by CHIP if the key field is not required. Similarly, the No Data Required parameter is set by CHIP if the data field is not required. These bits enable DIP to clock over the key field or the data field. The CHIP retry parameter at bit 7 indicates to the unusual situation processor that CHIP is performing a retry.

In RCF2, the record type bits indicate the type of record contained in the buffer image. If these two bits are zero, a normal record is in the buffer. 0-1 indicates a home address, 1-0 indicates record zero, and 1-1 indicates the index or end-of-track. The end-of-track (EOT) indicator is used by CHIP to sense completion status on Read Track commands at EOT time rather than at the beginning of the next track. The EOT indicator is also used by CHIP to start index processing to determine what the next track is to be. Index processing views track sequence indicators in control storage to obtain next track information. The Invalid Track flag, bit 10, indicates that this track was found to be invalid when being read from DASD by DIP. The Go-To-Cache-Host-Operations flag indicates that DIP is shut down and CHIP should exit to channel host operations. The DIP retry parameter, bit 15, indicates that a field in this record was retried by DIP. This bit is used by the unusual situation processor for error recovery.

As stated above, a mechanism is needed to communicate between DIP and CHIP so that the two processes do not overlay each other in processing data in the buffer. The buffer is divided into 256-byte pages so that a page address can be contained in a one-byte register. Each record starts on a page boundary. The page address that CHIP is working on is placed in the CBUF register. The page address that DIP is working on is placed in the DBUF register. These two registers are used to allocate space in the buffer so that the two processes do not interfere.

For write operations, CHIP advances CBUF at completion of data transfer for each record. For read operations, CHIP advances CBUF when the next CCW is received for a new record. DIP advances DBUF when the data field has been transferred for both read and write operations.

Each time that CHIP or DIP wrap CBUF or DBUF to the beginning of the buffer, the WRAP parameter is toggled. A WRAP value of zero indicates that CHIP and DIP are on the same pass through the buffer. A WRAP value of one indicates that the filling process has wrapped from the end of the buffer to the front, and the emptying process has not.

On a read operation, DIP stores records into the buffer and advances DBUF. For each record that DIP stores in the buffer, it stores DORF.R with the record. When CHIP searches for the records it wants, it compares CORF.R with DORF.R in the buffer for that record. If the comparing result is equal, CHIP transfers the record to the channel; otherwise CHIP advances CBUF to the next record and compares again until a match or an index is found.

On read operations, DIP is the buffer filler, and CHIP is the buffer emptier. CBUF, DBUF and WRAP are used as described in FIG. 5, Table 4, to prevent DIP from overlaying records in the buffer that are still required by CHIP. Table 4 shows that if the WRAP bit is zero, it is alright for DIP to proceed. However, if the WRAP bit is one, DBUF must be compared with CBUF and if DBUF is less than CBUF, it is alright for DIP to proceed since this indicates that DIP is operating on a page which has already been processed by CHIP. However, if WRAP is one and DBUF is equal to or attempts to be greater than CBUF, then it is necessary for DIP to halt processing. The device will then be required to reorient; that is, a lost rotation will occur.

Figure 5:
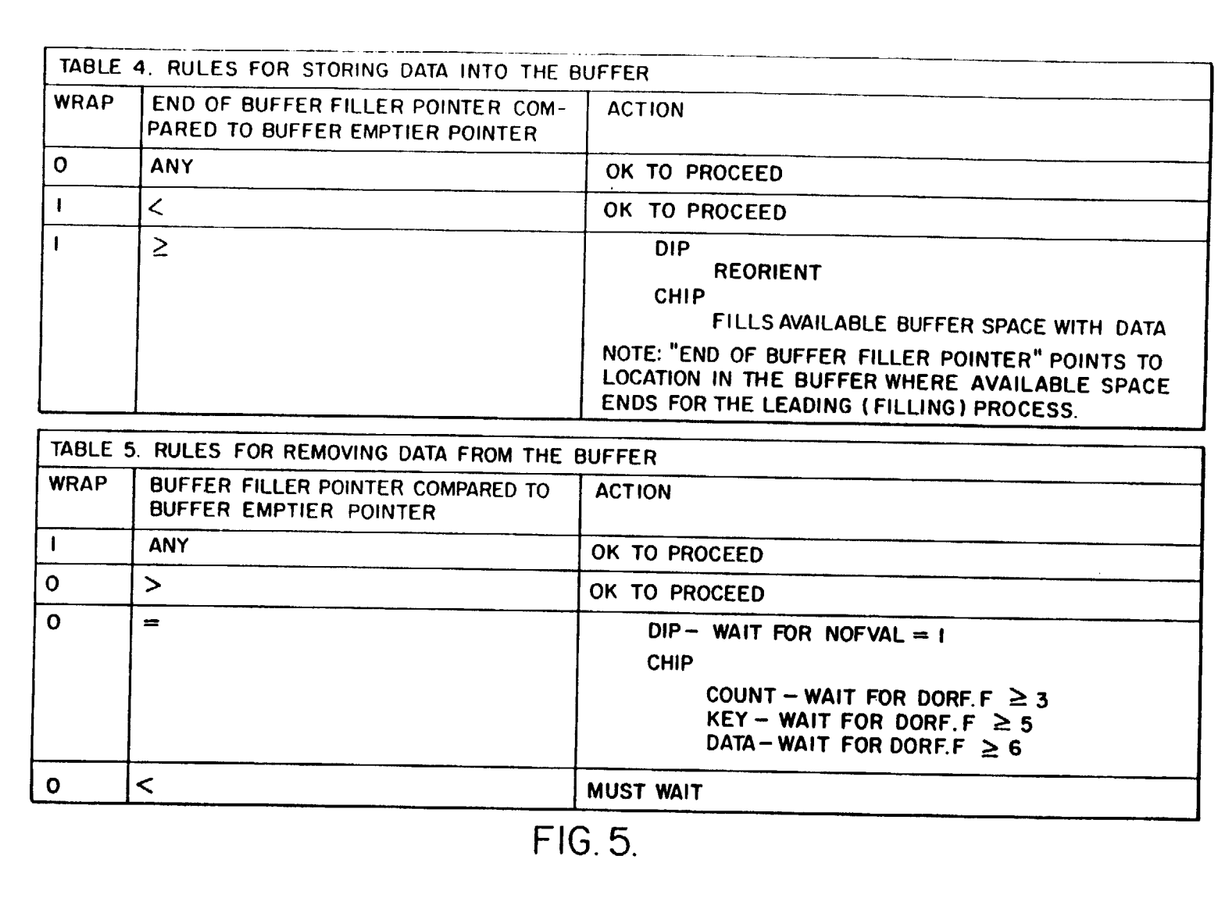
FIG. 5, comprised of Tables 4 and 5, shows rules for storing and removing data from the buffer.

On write operations, Table 4 shows that if the WRAP bit is zero, it is alright for CHIP to proceed in filling the buffer. If the WRAP bit is one and CBUF is less than DBUF, it is alright for CHIP to proceed in filling the buffer. However, if the WRAP bit is one and CBUF is equal to or attempts to be greater than DBUF, then CHIP must wait until DIP has completed its write operations before filling that buffer space with the next record.

Table 5, FIG. 5, shows rules for removing data from the buffer. In this case, on read operations if the WRAP bit is one, CHIP can proceed to remove all of the records to the end of the buffer. However, if the WRAP bit is zero on read operations, and if DBUF is greater than CBUF, then CHIP can proceed to remove records; but if CBUF is equal to DBUF, then CHIP must wait. Table 5 shows particular implementing rules for waiting to read count, key, and data fields.

On write operations, Table 5 shows that if WRAP is one, it is alright for DIP to proceed writing records to the end of the buffer. If the WRAP bit is zero, it is alright for DIP to proceed if CBUF is greater than DBUF. However, if CBUF is equal to DBUF, then DIP must wait for the Next Operating Field Valid (NOFVAL) bit to equal one before it proceeds. If the WRAP bit is zero and CBUF is less than DBUF, DIP must wait.

Note that the control bit NOFVAL, when set, indicates that CHIP has completed the count field, set up the Next Operating Field (NOF) in the buffer, and loaded the Channel Buffer Pointer (CBP) 36 to block the Device Buffer Pointer (DBP) 35 during data transfer.

To summarize, on read operations, DIP goes through the buffer letting in records and building the track image. When DIP gets to the end of the buffer, it wraps to the top and keeps on going. CHIP follows along behind. CBUF and DBUF are used to coordinate between CHIP and DIP.

When a write operation is to be performed, a locate record instruction informs the control unit 12 of the number of records that are to be written in the domain but the control unit will not know what the count fields are for the records. They may be on the same tracks, or they may be on different tracks. The channel interface processor commences to transfer the records from the channel to the buffer, while the device interface processor orients the device to write the first of the records to be transferred. While DIP is orienting, CHIP goes ahead and transfers records into the buffer; it might do the entire data transfer of several records before DIP has completed orienting. When DIP is oriented, DIP inspects the NOF, finds out what to do and steps down through the buffer writing the data to the device. When DIP reaches the last record, the intent count for the domain will equal one thus enabling DIP to inform CHIP when it has completed the write. Also, DIP can inform the unusual situation processor in case error recovery is needed. In nonsynchronous operation, the successive write operations are performed by CHIP to the end even though DIP might encounter an error on one of the intermediate records. The intent count will indicate the number of records yet to be written to the device when the error occurred.

At the end of a successful write operation, a write domain complete byte is set signaling CHIP that the write operation has been successful and CHIP can go on to other business. The next thing DIP does is to switch immediately into read mode. This is done in a completely interlocked manner so that there are no timing problems in switching DIP from write operations to read operations.

It should be noted that there is an additional collision avoidance mechanism in a channel buffer pointer 36 and a device buffer pointer 35, shown in FIG. 2. When CHIP and DIP are working on the same record, these two pointers are implemented such that they cannot cross one another. Therefore, the trailing process is halted until there is time to allow the leading process to get ahead so that they can simply follow one another.

Also, during write operations, DIP needs to know the size of the key and data fields. The count field is copied by DIP into the protected area shown at 33 in FIG. 2. A pointer BFPGR is set to point to where the count field is in the protected area. Therefore, on write commands, BFPGR points to the protected area, while DBUF points to wherever the data field is. DBUF wraps around the buffer, while the Buffer Page General Register BFPGR always points to a spot in the protected area.

Another important communicating element between the device and channel in a nonsynchronous system is a bit called the Reorient bit that is set by DIP whenever the device is reorienting; that is, searching for the correct record location in the device. Since it may take several milliseconds for the device to orient to the correct record, when CHIP gets to the point that it is waiting for DIP to proceed in the buffer to get out of its way, CHIP inspects the Reorient bit, and if that bit is set, then CHIP knows that DIP is in a reorienting condition. Since several milliseconds is a very long length of time for a channel to be idle, CHIP will release the channel for other work. When DIP finally reorients and turns the Reorient bit off, CHIP gets the channel back and the process proceeds.

This communicating element is also used by the unusual situation processor for error recovery. When DIP has a problem, it shuts down, sets an error signal and waits. When this happens, CHIP may eventually run into DIP, similar to the situation on a reorient. However, if CHIP completes its operation prior to running into DIP in the buffer, there is no reason to stop CHIP simply because DIP is in error. Therefore, CHIP proceeds, completes the process, and releases the channel for other work. The fact that DIP is in error is transparent to the channel.

Unusual Situation Processor (USURP) 19, must decide what to do in an error recovery situation and if it determines that command retry is necessary, it notifies CHIP and DIP of the situation. When the retry commences, CHIP begins over again and DIP goes through a reorientation setting the Reorient bit until the reorientation is complete. When it is, the Reorient bit is turned off and the operation is restarted.

Having thus described our invention, it will be understood by those skilled in the art that changes in form and details may be made without departing from the spirit and scope of the invention.

What is claimed is:

1. An apparatus for a peripheral data processing system including, in combination:
   a DASD with a plurality of recording tracks;
   a device interface processor (DIP) connected to said DASD to control the transfer of data records to and from said recording tracks;

a channel interface processor means for connection to a channel to control the transfer of data records to and from said channel in a manner that is not synchronous with data record transfer performed by said DIP;

control storage means connected to said CHIP and said DIP for containing control parameters;

buffer storage means connected to said DIP and to said CHIP for containing data records intermediate to its transfer to and from said DASD and said channel, said data records placed into said buffer means by a leading process and removed therefrom by a trailing process, said trailing process beginning the removal of data records from said buffer storage means at a time after data record entry by said leading process;

wherein said DIP operates said leading process on read operations to place data records in said buffer from a first location to a last location, while said CHIP operates said trailing process to remove data records from said buffer means placed there by said leading process to send the data records to said channel thereby enabling the DIP and CHIP processors to operate on different records;

wherein said CHIP operates said leading process on write operations to place data records in said buffer from a first location to a last location, while said DIP operates said trailing process to remove data records from said buffer placed there by said leading process to send the data to said DASD;

wherein said leading process wraps to said first location of said buffer after it has filled said last location in order to continue filling said buffer with records; and WRAP indicating means located within said control storage set by said leading process upon filling said last location in said buffer and reset by said trailing process upon emptying said last location in said buffer;

whereby the DIP and CHIP processors can inspect said WRAP indicating means to communicate with each other in order to discover which processor is processing buffer locations nearer said first location in said buffer and which processor is nearer said last location.

2. The apparatus of claim 1 further including:

first record control indicating means contained in said buffer means set by CHIP on read operations for directing DIP to skip the next field or the remaining records in the track; and second record control indicating means contained in said buffer means set by DIP on write operations to indicate the status of the record transferred from said buffer to said DASD to indicate errors encountered.

3. The apparatus of claim 1 further including a channel Buffer Record Pointer means (CBUF) located in said control storage, set by CHIP to indicate the buffer record address of that record CHIP is currently processing; and a Device Buffer Record Pointer means (DBUF) located in said control storage, set by DIP to indicate the buffer record address of that record DIP is currently processing;

said CBUF means and said DBUF means together with said WRAP means providing a communication mechanism to said DIP and said CHIP processors to enable the processes operating on said processors to avoid catching up with one another and overlaying data in said buffer needed by the other.

4. The apparatus of claim 3 further including next operating field indicating means located in said buffer storage means set by CHIP during write operations in response to write commands received form said channel to inform DIP of the next command when DIP reaches that point in its buffer operation; and valid indicating means located in said control storage means for signalling DIP, in write operations, that CHIP has completed loading various record data and has set said next operation field indicating means to thereby inform DIP that it is alright to proceed.

5. The apparatus of claim 4 further including with the record in said buffer:

means for holding the address of the immediately preceding record in said buffer, the address of said preceding record set by said leading process and used by said trailing process to validate the buffer location of the trailing process as a proper start location for processing the next record in the buffer.

6. An apparatus for a peripheral data processing system including, in combination:

a DASD with a plurality of recording tracks;

a device interface processor (DIP) connected to said DASD to control the transfer of data records to and from said recording tracks;

a channel interface processor means (CHIP) for connection to a channel to control the transfer of data records to and from said channel in a manner that is not synchronous with data record transfer performed by said DIP;

buffer storage means connected to said DIP and to said CHIP for containing data records intermediate to their transfer to and form said DASD and said channel;

first record control indicating means contained in said buffer means set by CHIP on read operations in response to requests form said channel for directing DIP to skip the next field or the remaining records in the track; and second record control indicating means contained in said buffer means set by DIP in write operations to indicate the status of the record transferred from said buffer means to said DASD to indicate errors encountered.

7. The apparatus of claim 6 wherein said second record control indicating means further includes an End-Of-Track (EOT) indicator, set by DIP on read/write operations to inform CHIP that a track switch is needed, and on read track operations to inform CHIP of completion.

* * * * *

UNITED STATES PATENT AND TRADEMARK OFFICE
CERTIFICATE OF CORRECTION

PATENT NO. : 5,155,814
DATED : October 13, 1992
INVENTOR(S) : Brent C. Beardsley et al It is certified that error appears in the above-indentified patent and that said Letters Patent is hereby corrected as shown below:

On the title page, item [54] and in column 1, lines 2 and 3, in the title rewrite "NONSYNCHRONOOUS CHANNEL/DASD COMMUNICATION SYSTEM" as --NONSYNCHRONOUS CHANNEL/DASD COMMUNICATION SYSTEM--.

At column 11, line 1, "means for" should read --means (CHIP) for--.

At column 11, bridging lines 56 and 57, "a channel" should read --a Channel--.

At column 12, line 13, "form said" should read --from said--.

At column 12, line 44, "from said" should read --from said--.

At column 12, line 48, "form said" should read --from said--.

Signed and Sealed this

Twenty-eighth Day of September, 1993

Attest:

BRUCE LEHMAN

*Attesting Officer*     *Commissioner of Patents and Trademarks*